US006250853B1

(12) United States Patent
Sumetzberger

(10) Patent No.: US 6,250,853 B1
(45) Date of Patent: Jun. 26, 2001

(54) CARRIER FOR A PNEUMATIC TUBE TRANSPORT SYSTEM

(76) Inventor: Gerhard Sumetzberger, Werkstättenweg 87, A-1110 Vienna (AT)

( * ) Notice: Subject to any disclaimer, the term of this patent is extended or adjusted under 35 U.S.C. 154(b) by 0 days.

(21) Appl. No.: 09/262,384

(22) Filed: Mar. 4, 1999

(30) Foreign Application Priority Data

Mar. 6, 1998 (AT) ......................................... 396/98
Dec. 30, 1998 (EP) .................................... 98890383

(51) Int. Cl.⁷ ................................................ B65G 51/06
(52) U.S. Cl. ............................................................ 406/188
(58) Field of Search ................................. 406/187, 188, 406/189

(56) References Cited

U.S. PATENT DOCUMENTS

| 657,076 | * | 9/1900 | Batcheller ........................... 406/187 |
| 3,323,755 | * | 6/1967 | Voital et al. ........................... 243/35 |
| 3,788,577 | * | 1/1974 | Barnett et al. ......................... 243/35 |
| 4,362,443 | * | 12/1982 | Mallory et al. ....................... 406/188 |

FOREIGN PATENT DOCUMENTS

4111492 * 10/1992 (DE) ..................................... 406/187

* cited by examiner

Primary Examiner—Christopher P. Ellis
Assistant Examiner—Joe Dillon, Jr.

(57) ABSTRACT

A carrier for a pneumatic tube transport system has a rigid sleeve centered on an axis and having an axially open end, a collar coaxially surrounding the sleeve and formed with a radially inwardly directed edge, and a cover fittable axially over the sleeve in a closed position axially closing the sleeve end and formed with a radially outwardly directed edge closely juxtaposed with the collar edge in the closed position. A pivot defines a pivot axis parallel to the sleeve axis for pivoting of the cover about the pivot axis between the closed position and an open position angularly offset therefrom and unblocking the sleeve end. A compressible seal ring is engaged between the cover and the ring and seals between the cover and the ring in the closed position. A tab projecting generally perpendicular to the sleeve axis on one of the edges engages in a recess open generally perpendicular to the sleeve axis on the other of the edges receiving the tab in the closed position of the cover so that when the tab is engaged in the recess the cover is blocked against axial movement on the sleeve.

13 Claims, 8 Drawing Sheets the sleeve and formed with a radially inwardly directed edge, and a cover fittable axially over the sleeve in a closed position axially closing the sleeve end and formed with a radially outwardly directed edge closely juxtaposed with the collar edge in the closed position. A pivot defines a pivot axis parallel to the sleeve axis for pivoting of the cover about the pivot axis between the closed position and an open position angularly offset therefrom and unblocking the sleeve end. A compressible seal ring is engaged between the cover and the ring and seals between the cover and the ring in the closed position. In accordance with the invention a tab projecting generally perpendicular to the sleeve axis on one of the edges engages in a recess open generally perpendicular to the sleeve axis on the other of the edges receiving the tab in the closed position of the cover so that when the tab is engaged in the recess the cover is blocked against axial movement on the sleeve.

CARRIER FOR A PNEUMATIC TUBE TRANSPORT SYSTEM

FIELD OF THE INVENTION

The present invention relates to a carrier for a pneumatic tube transport system. More particularly this invention concerns such a carrier usable to transport liquids under hermetic conditions.

BACKGROUND OF THE INVENTION

A standard pneumatic tube transport system uses carriers each formed as a rigid sleeve whose ends are provided with collars having guide rings that ride on the inside surface of the transport tube and with at least one membrane-type annular seal engaging the tube inner surface so air pressure can move the carrier along the tube without blowing past the carrier. The carrier has one end that is closed and an opposite end that is provided with an openable cover. Such devices can be used for transporting documents, samples, or virtually any small object that must be moved through rapidly between fixed locations. The standard carrier cover displaceable pivotally between a closed position engaged over the sleeve end and an open position offset from it, normally pivoting about an axis parallel to the axis of the sleeve as described in German 297 08 204.

In a particularly common application, such a system is used in a hospital to transport blood samples, biopsy specimens, and the accompanying paperwork between the patient floors, operating theaters, and laboratories. Accordingly a carrier is described in U.S. Pat. No. 5,636,974 which splits along a plane including the sleeve axis into two halves and that can be solidly closed together. This system reduces the possible leakage of biohazards into the tubing of the transport system. It is, however, fairly complex and expensive and is mainly aimed at cushioning the contents of the carrier so that, if they do leak, the contents can get out of the carrier into the tubing system where they not only present the possibility of spreading disease, for instance a long-lived staphylococcus infection, but also can create a sticky mess that can cause the carriers to get stuck in the tube. Cleaning and disinfecting a contaminated tube is a complex job that entails considerable downtime for the critical system.

When the carriers are made particularly tight, as for instance with special closures or screw tops, they become difficult to open. The longitudinally subdivided system of above-cited U.S. Pat. No. 5,636,947 requires two hands to open and must be wholly pulled out of the tube before it can be opened. These systems are frequently setup so that when the carriers come to rest their ends merely project out of the tube docking station with the idea that the tube can be opened with one hand, something that is impossible with the prior-art tight-seal carriers.

OBJECTS OF THE INVENTION

It is therefore an object of the present invention to provide an improved carrier for a pneumatic tube transport system.

Another object is the provision of such an improved carrier for a pneumatic tube transport system which overcomes the above-given disadvantages, that is which seals tightly, but that if easy to open and close.

SUMMARY OF THE INVENTION

A carrier for a pneumatic tube transport system has according to the invention a rigid sleeve centered on an axis and having an axially open end, a collar coaxially surrounding the sleeve and formed with a radially inwardly directed edge, and a cover fittable axially over the sleeve in a closed position axially closing the sleeve end and formed with a radially outwardly directed edge closely juxtaposed with the collar edge in the closed position. A pivot defines a pivot axis parallel to the sleeve axis for pivoting of the cover about the pivot axis between the closed position and an open position angularly offset therefrom and unblocking the sleeve end. A compressible seal ring is engaged between the cover and the ring and seals between the cover and the ring in the closed position. In accordance with the invention a tab projecting generally perpendicular to the sleeve axis on one of the edges engages in a recess open generally perpendicular to the sleeve axis on the other of the edges receiving the tab in the closed position of the cover so that when the tab is engaged in the recess the cover is blocked against axial movement on the sleeve.

With this system the cover can swivel as is conventional, but is solidly held in place axially against the collar by the interfitting tab and recess. Thus it is axially secured in a position where the seal is effective so that, even if a liquid-filled vial inside the carrier breaks, its contents will not leak out of the carrier. The seal would be ineffective all by itself, but in combination with the axial-retaining tabs, the seal maintains the carrier hermetically closed even under the extreme acceleration and deceleration conditions it is subjected to.

According to the invention the one edge has a plurality, of the tabs and the other edge has a complementary plurality of the recesses. This is most effectively done when the cover has an axially projecting generally semicylindrical projection centered on the sleeve axis and forming a second cover edge separate from the first-mentioned cover edge and the collar has an axially oppositely projecting generally semicylindrical projection centered on the sleeve axis, forming the collar edge, and meeting the cover projection along a line generally diametral of the sleeve axis and including the pivot axis. Such a carrier further has a second tab projecting generally perpendicular to the sleeve axis on one of the second edges and a second recess open generally perpendicular to the sleeve axis on the other of the second edges. The result is an extremely effective axial locking of the cover on the collar.

The cover according to the invention is limitedly axially displaceable relative to the sleeve. To this end the carrier further has a spring braced between the cover and the collar axially urging the cover toward the collar and cams for forcing the cover axially away from the collar on displacement of the cover out of the closed position. The cams includes a pair of cam formations symmetrically flanking the pivot axis.

The seal ring according to the invention can be recessed axially in the collar and the cover can have an annular ridge axially engaging the seal ring in the closed position. In this case the seal ring has a sheet-metal core ring surrounded by a mass of elastomer and has a flexible lip engageable with the cover ridge and a plurality of radially projecting tabs set in the collar. Furthermore the collar has radially throughgoing slots receiving the tabs of the seal ring and the carrier further has an identifying ring engaged around the collar at the slots and having inwardly projecting tabs engaged in the slots. Alternately the seal can be mounted on the cover and axially engageable with an edge of the collar.

The collar in accordance with the invention is formed with radially inwardly directed L-shaped grooves and the sleeve is formed with radially outwardly projecting bumps engaged in the grooves and locking the collar bayonet-fashion to the sleeve. Furthermore for locking purposes the collar is formed with an undercut axially outwardly open blind bore adapted to receive a miniature lock and the cover is formed with an axially throughgoing hole aligned with the bore in the closed position. For tagging purposes the cover is formed with a tag-receiving recess open axially outward and with a radially open slot communicating with the tag recess. The recess are T-shaped.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
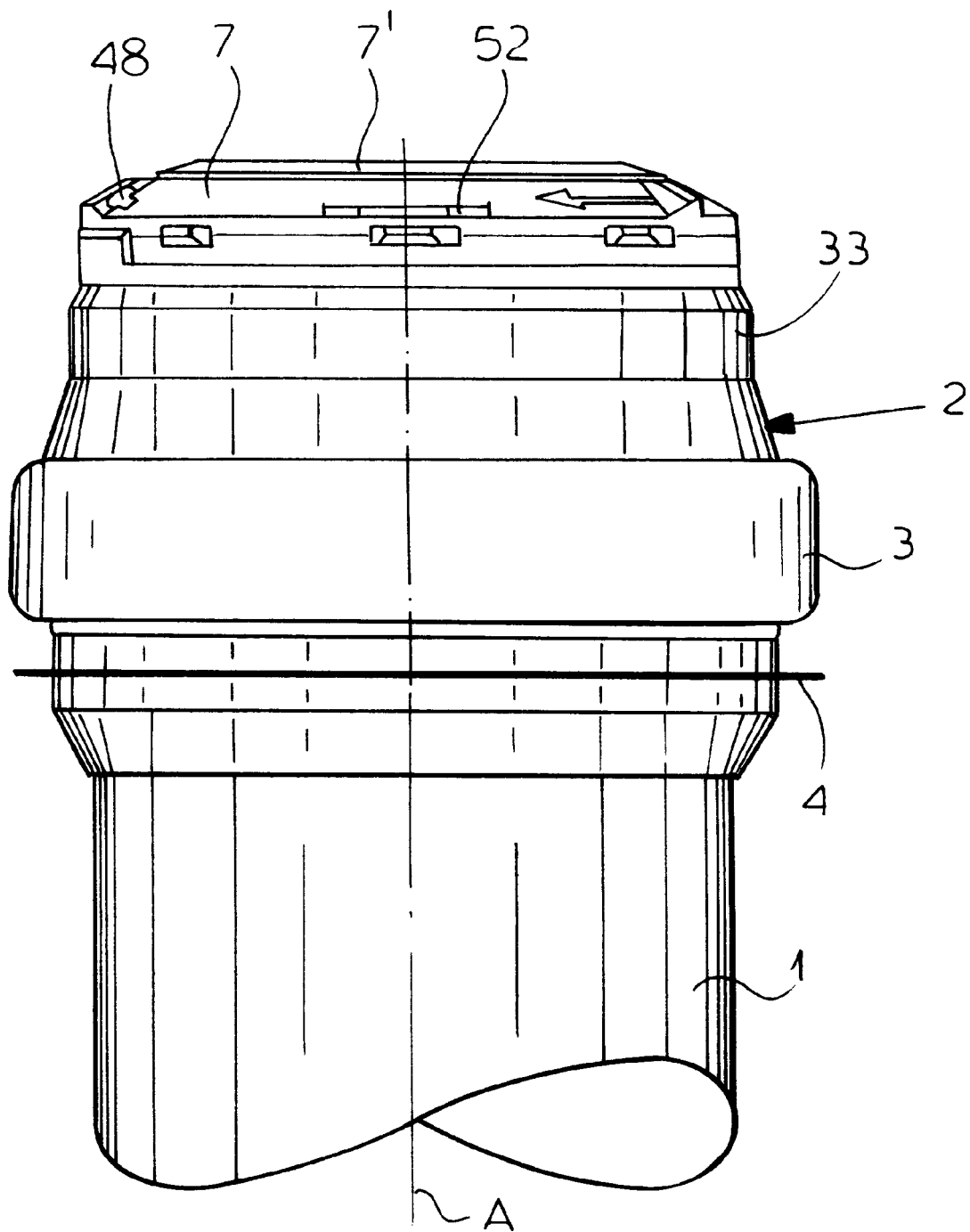
FIG. 1 is a side view of a head end of a carrier according to the invention.

As seen In FIG. 1 a carrier has a sleeve 1 of cylindrical shape and centered on an axis 2A. Its unillustrated lower end is closed by a conventional cap. Its upper end has a head collar 2 carrying a guide/support ring 3 adapted to ride on the inside surface of a conveying tube and is provided therebelow with a radially outwardly projecting annular seal 4 that prevents any blow-by past the carrier. The head collar 2 is formed with L-shaped inwardly open grooves 5 and 5' in which engage outwardly projecting bumps 6 and 6' formed on the sleeve 1 to axially lock the two parts together, bayonet fashion with the bumps 6 and 6' engaged at the blind ends of angularly extending legs of the grooves 5 and 5'.

A cover 7 closes the outer end of the head collar 2 and can swivel about a pivot pin 8 extending along an axis 8A parallel to the axis 2A and fixed in the cover 7. The head collar 2 is formed with a cylindrical bore 9 extending parallel to the axis 2A, coaxially receiving the pin 8, and of substantially greater diameter than the pin 8. A compression spring 10 surrounds this pin 8 and has a lower end bearing on an enlarged head 11 of the pin 8, that incidentally is of the same outside diameter as the inside diameter of the bore 9 to prevent canting of the pin 8 in the bore 9, and an upper end bearing on a plate 12 fixed on the sleeve 2 and projecting into the bore 9. Thus the cover 7 can move limitedly axially relative to the collar 2. The cover 7 has a downwardly projecting collar 13 coaxially surrounding the pin 8 and of the same diameter as the bore 9 to so that the cover 7 will pivot smoothly about the axis 8A of the pin 8, remaining perpendicular to the axis 2A.

Flanking the collar 13 the cover 7 has two recesses 14 and 15 (FIGS. 8 and 9) which run out as inclined cam surfaces 16, 16' and 17, 17'. Similarly the collar 2 has as shown in FIG. 10 two recesses 18 and 19 flanking the bore 9 and holding cam wedges 20 and 21. When the cover is in the illustrated closed position the wedges 20 and 21 engage in the bases of the recesses 14 and 15. When, however, the cover 7 is pivoted about the pin axis 8A, the wedges 20 and 21 effect a cam action to lift the cover 7 axially as it moves angularly. Once the cover 7 has been pivoted enough for the wedges 20 and 21 to move angularly out of the recesses 14 and 15, they ride on a planar inner face 22 that extends perpendicular to the axis 2A, thereby holding the cover 7 axially up and away from the end of the collar 2. Since the wedges 20 and 21 and recesses 14 and 15 symmetrically flank the pin axis 8A, the cover 7 does not twist or cant as it moves angularly, but stays perpendicular to the axis 2A.

It is of course within the scope of the invention to form the wedges 20 and 21 unitarily with the collar 2. Alternately they could be formed on or fitted in the cover 7 and the collar 2 could be formed with the recesses 14 and 15.

Figure 3:
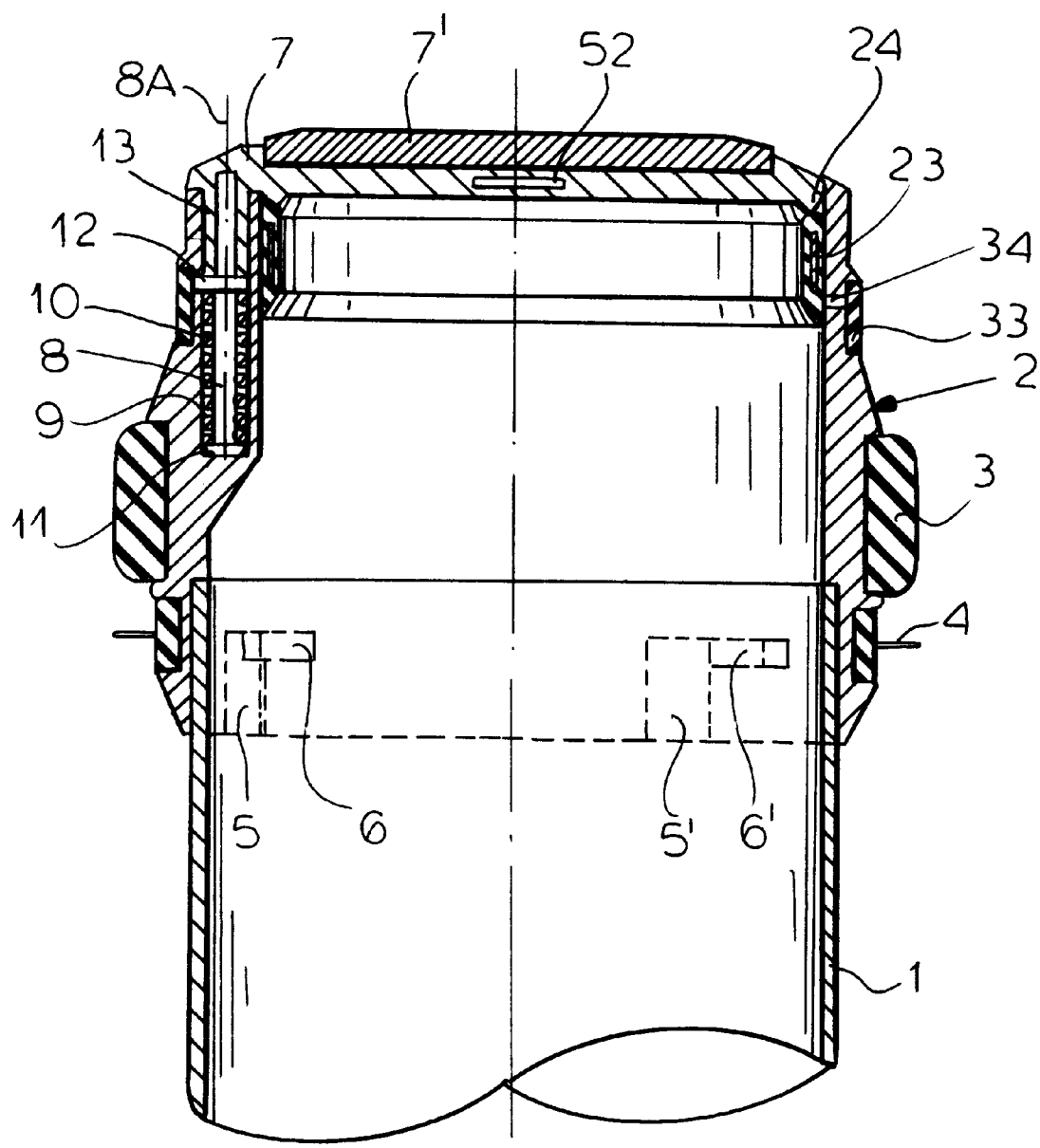
FIGS. 3 and 4 are sections taken along respective lines III—III and IV—IV of FIG. 2.
Figure 4:
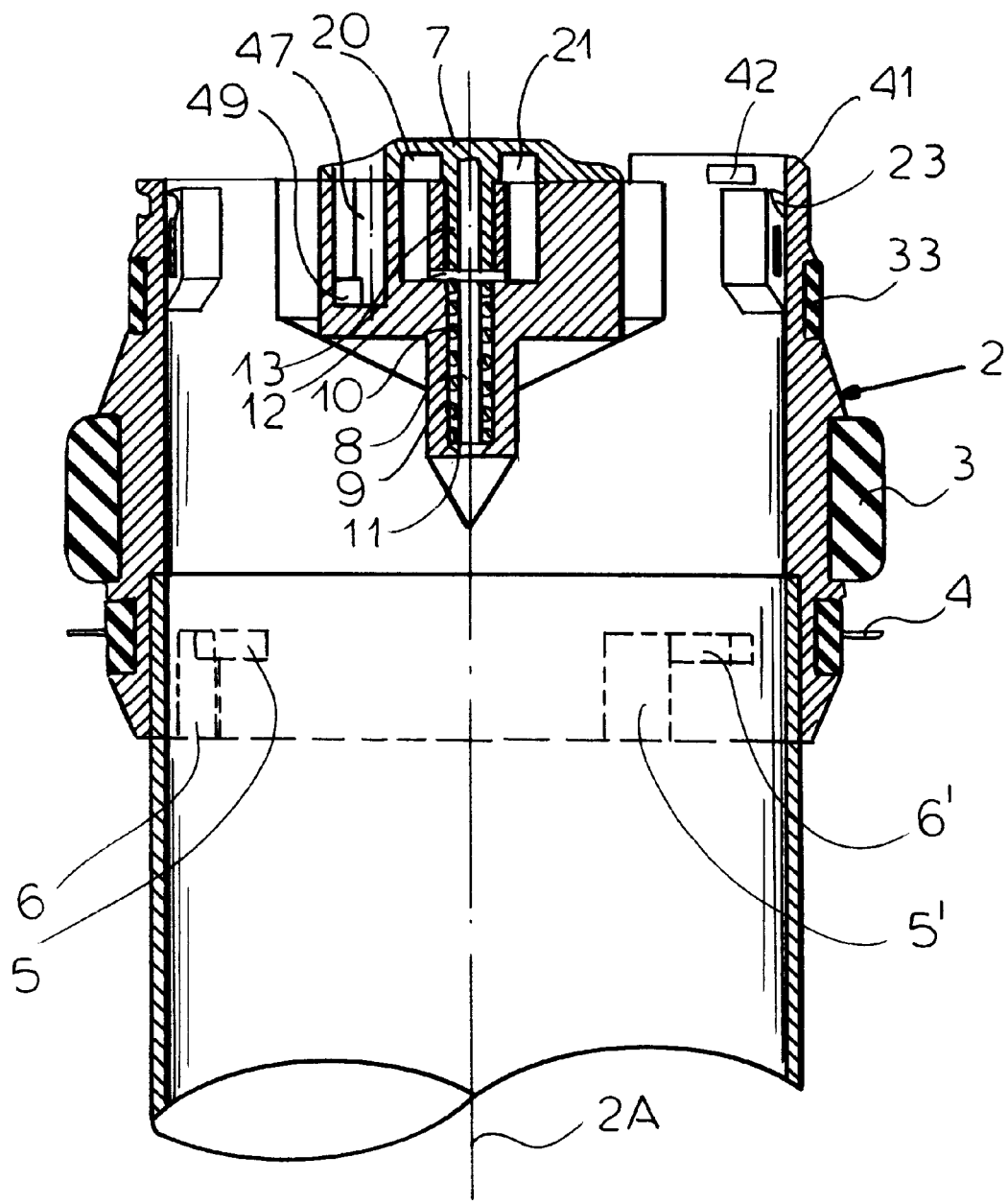

A seal ring 23 is provided inside the collar 2 as shown in FIGS. 3 and 4. When the cover 7 is closed it bears against this seal ring 23 with an annular triangular-section ridge 24. Since the cover 7, when pivoted angularly, initially makes an axial outward step due to interaction of the wedges 20 and 21 with the recesses 15 and 16, this ridge 24 pulls axially away from the seal ring 23 at the very start of the swiveling opening movement, thereby avoiding any twisting contact with it that could damage it or cause it to wear prematurely.

Figure 6:
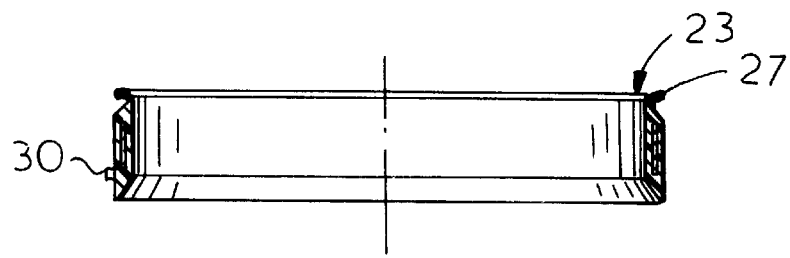
FIG. 6 is a section taken along line VI—VI of FIG. 5.
Figure 7:
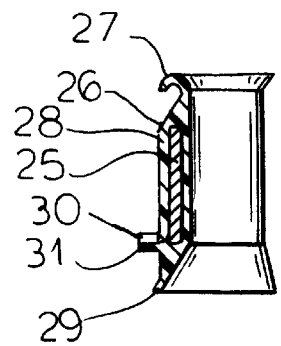
FIG. 7 is a large-scale view of a detail of FIG. 6.
Figure 5:
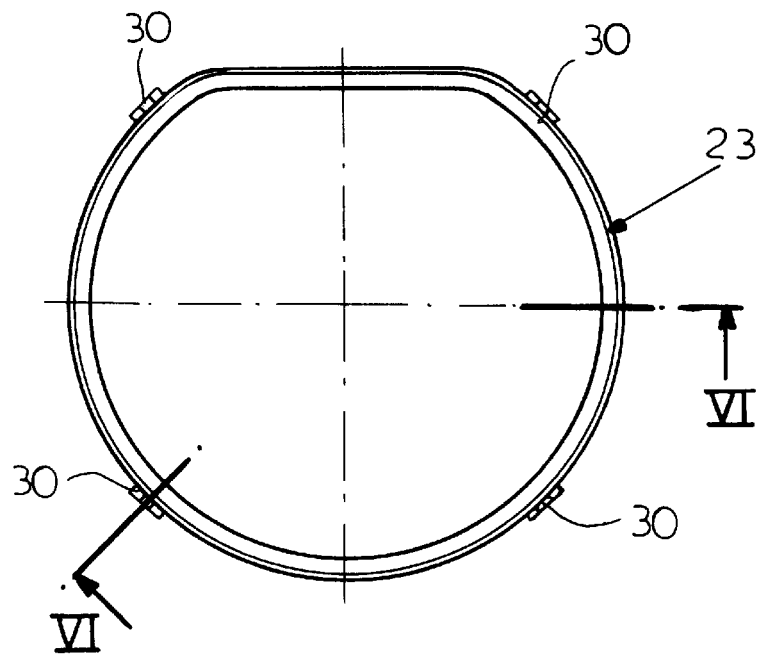
FIG. 5 is an end view of the seal for the carrier.

As better shown in FIG. 5 through 7, the ring 23 is made of elastomeric material molded around a sheet-metal ring 25. The ring 23 forms a flexible and annular upper end 26 in turn forming a U-shaped lip 27 intended to engage the ridge 24. It also is formed with seal lips 28 and 29 (FIG. 7) that outwardly engage and seal against the inner surface of the collar 2. It has four radially outwardly projecting tabs 30 formed around radially outwardly projecting tabs 31 of the metal core ring 25 and projecting into radially throughgoing slots 32 (FIG. 10) of the collar 2. These tabs 30 are a snug fit in the slots 32 so no leakage is possible through them. A colored marking ring 33 is fitted over the outside of the collar 2 level with the slots 32 and has inwardly projecting tabs 34 engaged in these slots 32 to further seal them while solidly anchoring the ring 33 in place. This ring 33 can serve to identify the carrier.

Figure 2:
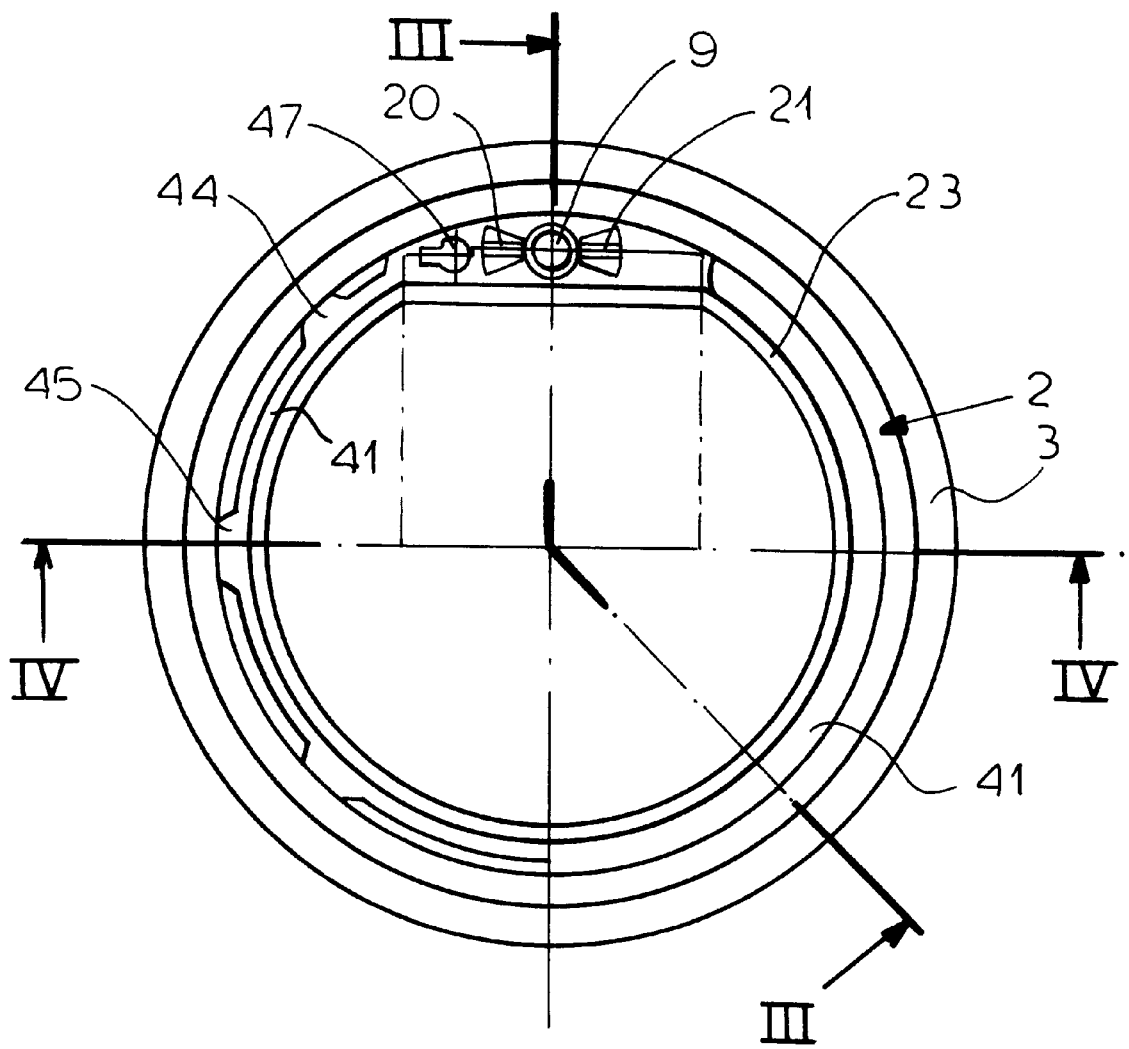
FIG. 2 is a top view of the carrier with the cover removed.
Figure 8:
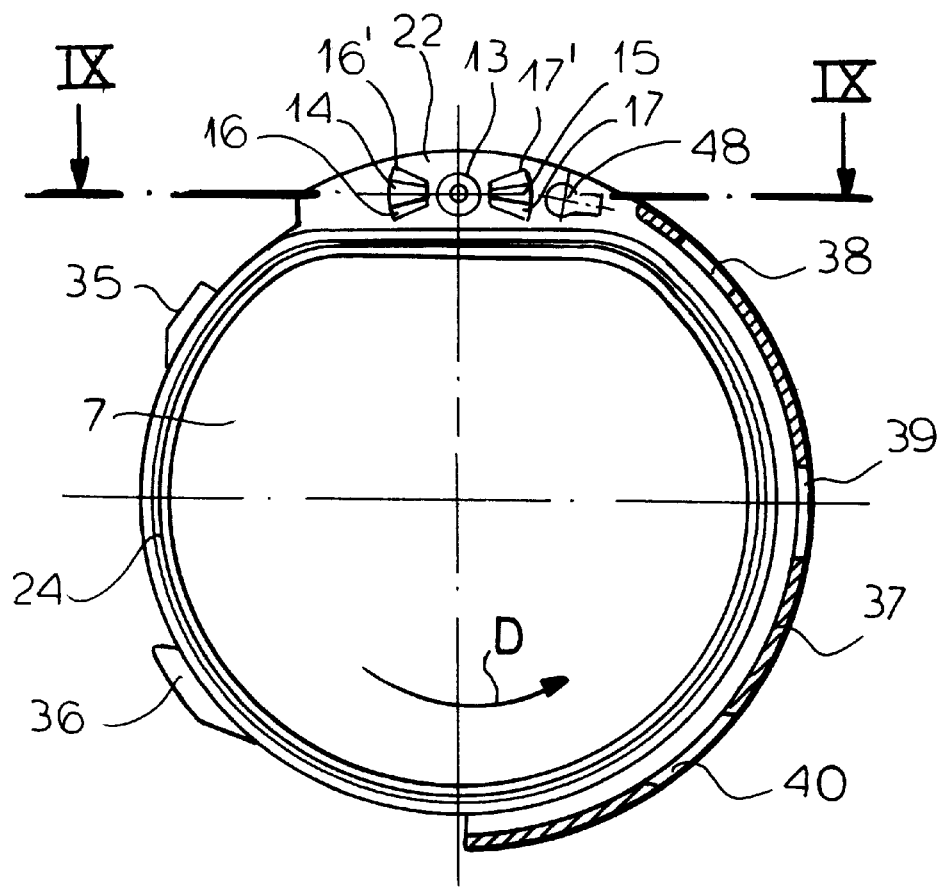
FIG. 8 is an end view of the cover from underneath.
Figure 9:
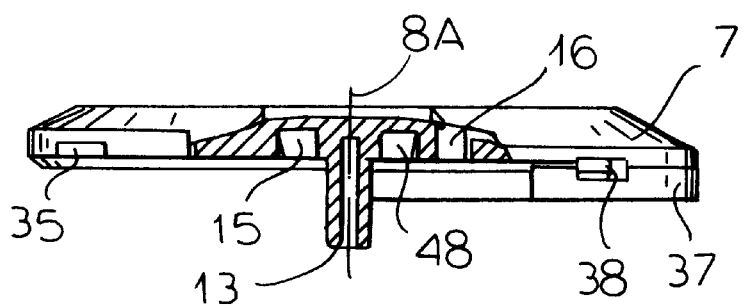
FIG. 9 is a section taken along line IX—IX of FIG. 8.
Figure 10:
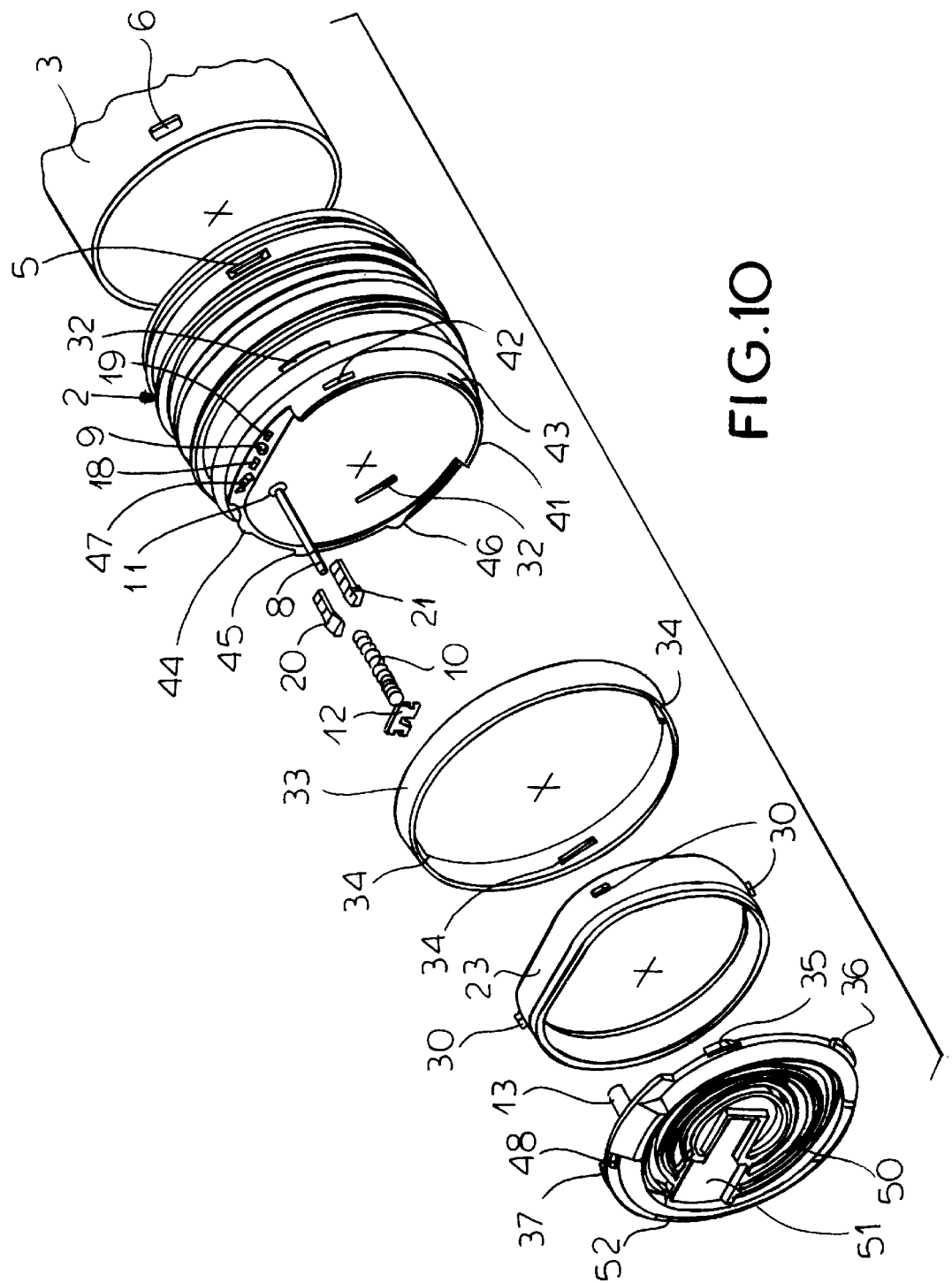
FIG. 10 is an exploded view of the head end of the carrier.

In order to prevent the contents of the carrier from knocking the cover 7 open, for instance when the carrier stops suddenly and the contents are thrust by inertia against the cover 7, this cover 7 has as shown in FIGS. 8 through 10 two radially outwardly projecting tabs 35 and 36 that project rearward relative to an opening direction D extending crosswise of the axis 2A. In addition the cover 7 has a semicylindrical extension 37 formed with three openings 38, 39, and 40 that also open rearward against the opening direction. The upper edge of the collar 2 has as shown in FIGS. 2 and 10 a complementary generally semicylindrical projection 41 that forms together with the projection 37 a complete ring and that is formed with openings 42 and 43 into which the tabs 35 and 36 fit when the cover 7 is closed. The upper edge of the collar 2 has offset from the extension 41 three radially projecting tabs 44, 45, and 46 that can fit into the recesses 38, 39, and 40 as shown in FIG. 8 in the closed position of the cover 7. Thus when the cover 7 is closed it is locked at five locations to the collar 2.

In order to facilitate the above-described axial movement, the tabs 35 and 36 have angled upper sides and the tabs 44, 45, and 46 have angled lower sides. The angle is, however, relatively flat so that an axial force against the cover 7 cannot push it open in direction O. Only when the cover 7 is twisted about the pin axis 8A, will it move axially outward and disengage the tabs 35, 36, 44, 45, and 46 from the recesses 38, 39, 40, 42, and 43.

The sleeve 2 is formed with an axially open hole 47 adapted to receive a miniature lock. The cover 7 as shown in FIGS. 8 and 9 has a corresponding axially throughgoing hole 48 and the hole 47 is undercut at 49 (FIG. 4) so that when the miniature lock is inserted in it and its end is swung out or expanded, it locks in place and the cover 7 cannot be pivoted on the collar 2.

As best seen in FIG. 10 the cover 7 is formed with a plurality of axially upwardly and outwardly open grooves 50 and as shown in FIG. 3 is fitted with an elastomeric bumper 7' filling these grooves 50. In addition the cover 7 as shown in FIGS. 3 and 10 is formed with a T-shaped recess 51 intended to hold an identifying tag which can be inserted from the side through a radially open slot 52. Thus there is room for information tags of two different sizes, a smaller one in the center of the cover 7 and a larger one on the edge of the cover 7.

Figure 11:
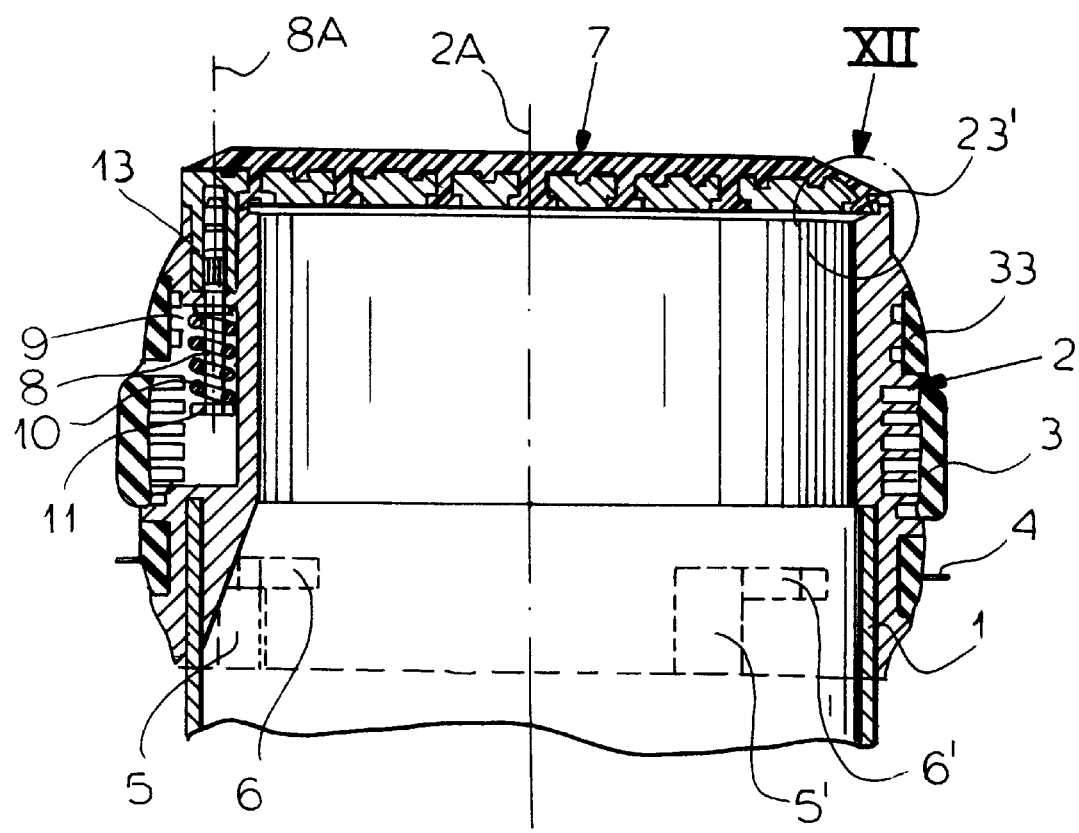
FIG. 11 is a view like FIG. 3 of an alternative arrangement according to the invention.
Figure 12:
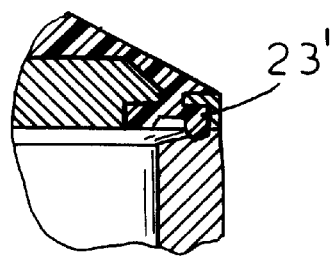
FIG. 12 is a large-scale view of the detail indicated at XII in FIG. 11.

In FIG. 11 a system is shown having a seal 23' carried on the cover 7 and engaging the upper edge of the collar 2. This is a construction that has the advantage of extreme simplicity but the modest disadvantage that removal and replacement of the seal 23' is somewhat more difficult than removal and replacement of the more complex seal 23.

I claim:

1. A carrier for a pneumatic tube transport system, the carrier comprising:

a rigid sleeve centered on an axis and having an axially open end;

a collar coaxially surrounding the sleeve and formed with a radially inwardly directed collar edge;

a cover fittable axially over the sleeve in a closed position axially closing the sleeve end and formed with a radially outwardly directed cover edge closely juxtaposed with the collar edge in the closed position;

means, including a pivot defining a pivot axis parallel to the sleeve axis, for pivoting of the cover about the pivot axis between the closed position and an open position angularly offset therefrom and unblocking the sleeve end;

a compressible seal ring engaged between the cover and a ring and sealing between the cover and the ring in the closed position;

a tab projecting generally perpendicular to the sleeve axis on one of the edges; and a recess open generally perpendicular to the sleeve axis on the other of the edges receiving the tab in the closed position of the cover, whereby when the tab is engaged in the recess the cover is blocked against axial movement on the sleeve.

2. The pneumatic carrier defined in claim 1 wherein the one edge has a plurality of the tabs and the other edge has a complementary plurality of the recesses.

3. The pneumatic carrier defined in claim 1 wherein the seal is mounted on the cover and is axially engageable with an edge of the collar.

4. The pneumatic carrier defined in claim 1 wherein the collar is formed with radially inwardly directed L-shaped grooves and the sleeve is formed with radially outwardly projecting bumps engaged in the grooves and locking the collar bayonet-fashion to the sleeve.

5. The pneumatic carrier defined in claim 1 wherein the collar is formed with an undercut axially outwardly open blind bore adapted to receive a miniature lock and the cover is formed with an axially throughgoing hole aligned with the bore in the closed position.

6. The pneumatic carrier defined in claim 1 wherein the cover is formed with a tag-receiving recess open axially outward and with a radially open slot communicating with the tag recess, the recess being T-shaped .

7. The pneumatic carrier defined in claim 1 wherein the collar is provided with a outer guide ring and there adjacent with an annular membrane-type seal.

8. The pneumatic carrier defined in claim 1 wherein the cover has an axially projecting generally semicylindrical projection centered on the sleeve axis and forming a second cover edge separate from the first-mentioned cover edge, the collar having an axially oppositely projecting generally semicylindrical projection centered on the sleeve axis, forming the collar edge, and meeting the cover projection along a line generally diametral of the sleeve axis and including the pivot axis, the carrier further comprising a second tab projecting generally perpendicular to the sleeve axis on one of the second edges; and a second recess open generally perpendicular to the sleeve axis on the other of the second edges.

9. The pneumatic carrier defined in claim 1 wherein the cover is limitedly axially displaceable relative to the sleeve, the carrier further comprising a spring braced between the cover and the collar axially urging the cover toward the collar; and cam means for forcing the cover axially away from the collar on displacement of the cover out of the closed position.

10. The pneumatic carrier defined in claim 9 wherein the cam means includes a pair of cam formations symmetrically flanking the pivot axis.

11. The pneumatic carrier defined in claim 1 wherein the seal ring is recessed axially in the collar and the cover has an annular ridge axially engaging the seal ring in the closed position.

12. The pneumatic carrier defined in claim 11 wherein the seal ring has a sheet-metal core ring surrounded by a mass of elastomer and has a flexible lip engageable with the cover ridge and a plurality of radially projecting tabs set in the collar.

13. The pneumatic carrier defined in claim 12 wherein the collar has radially throughgoing slots receiving the tabs of the seal ring, the carrier further comprising an identifying ring engaged around the collar at the slots and having inwardly projecting tabs engaged in the slots.

* * * * *